United States Patent [19]

Seki et al.

[11] Patent Number: 5,450,253
[45] Date of Patent: Sep. 12, 1995

[54] ADAPTIVE EQUALIZER FOR MAGNETIC REPRODUCING APPARATUS

[75] Inventors: Takahito Seki, Kanagawa; Hajime Inoue, Chiba; Chihoko Takizawa, Saitama, all of Japan

[73] Assignee: Sony Corporation, Tokyo, Japan

[21] Appl. No.: 238,980

[22] Filed: May 6, 1994

Related U.S. Application Data

[62] Division of Ser. No. 921,123, Jul. 29, 1992, abandoned.

[30] Foreign Application Priority Data

Aug. 3, 1991 [JP] Japan .................... 3-217810
Aug. 16, 1991 [JP] Japan .................... 3-229759

[51] Int. Cl.$^6$ .................... G11B 5/035; G11B 5/09
[52] U.S. Cl. .................... 360/65; 360/46
[58] Field of Search .................... 360/10.1, 10.3, 46, 360/65; 358/312, 335; 375/14

[56] References Cited

FOREIGN PATENT DOCUMENTS

| | | |
|---|---|---|
| 0147550 | 7/1985 | European Pat. Off. . |
| 0264228 | 4/1988 | European Pat. Off. . |
| 0332079 | 9/1989 | European Pat. Off. . |
| 0343929 | 11/1989 | European Pat. Off. . |
| 0390977 | 10/1990 | European Pat. Off. . |

OTHER PUBLICATIONS

IEEE Transactions on Magnetics vol. 35, No. 3, Aug. 1989 pp. 520–526, Kato et al., "An Adaptive Equalizer for R-Dat.".
IEEE Transactions On Magnetics vol. 35, No. 3, Aug. 1989, New York US pp. 520–526, XP0000065978 S Kato et al. 'An Adaptive Equalizer For R–Dat' p. 521, left column, line 34–p. 522, left column, line 1 p. 523, left column, line 2–line 8 p. 523, left column, line 20–p. 524, right column, line 18.
SMPTE Journal vol. 97, No. 1, Jan. 1988, White Plains, NY US pp. 8–12, XP000001443 S. Mita et al. 'Adaptive Equalization Techniques for Digital Video Recording Systems'.

*Primary Examiner*—Aristotelis Psitos
*Assistant Examiner*—W. Chris Kim
*Attorney, Agent, or Firm*—William S. Frommer; Alvin Sinderbrand

[57] ABSTRACT

The characteristic of a regenerative signal from a magnetic head 11 is compensated by a filter 14 serving as an equalizer. The regenerative signal thus compensated is then decoded at a decoder 15. An adaptive control unit 17 adjusts (modifies) the characteristic of the filter 14 on the basis of a decode error (residual) at the decoder 15 and an input to the filter 14. A servo control unit 18 sends a servo lock signal to the adaptive control unit 17 when a servo control operation at the time of reproduction is stabilized to start an automatic adjustment operation of the filter characteristic. Thus, it is possible to prevent in advance bad influence or effect on a compensating operation of the equalizer resulting from the fact that an adaptive adjustment operation of the filter characteristic might be carried out at the time when the servo control operation is unstable like at the time of building up of a reproducing operation.

13 Claims, 7 Drawing Sheets

ADAPTIVE EQUALIZER FOR MAGNETIC REPRODUCING APPARATUS

This application is a division of application Ser. No. 07/921,123, filed Jul. 29, 1992, now abandoned.

BACKGROUND OF THE INVENTION

1. Field of the Invention

This invention relates to a magnetic reproducing apparatus, and more particularly to a magnetic reproducing apparatus adapted for converting, e.g., a video signal to a digital signal to reproduce a signal recorded on a magnetic recording medium by making use of so called a partial response system.

2. Description of the Prior Art

Generally, in magnetic recording/reproduction, in order to compensate an amplitude distortion or a phase distortion, etc. resulting from the recording/reproducing characteristic with respect to a magnetic recording medium, an equalizer is used. In recent years, an adaptive equalizing system as used in communication has been adopted also in such magnetic recording/reproduction.

The adaptive equalizing has been conventionally developed as a technology to carry out high speed data transmission utilizing a telephone line. In the telephone line, the transmission path characteristic varies depending upon connection state of the line. For this reason, since the transmission path characteristic can not be sufficiently corrected with a fixed equalizer, there is the necessity of adaptively adjusting the characteristic of the equalizer.

In such a communication system, there are a method in which a signal of which waveform, etc. is known is transmitted to examine the transmission path characteristic to thereafter transmit a necessary signal (automatic equalizing), and there are methods in which a signal itself desired to be transmitted is used to examine the transmission path characteristic (adaptive equalizing). In either case, the object of the equalizer is to automatically eliminate distortion from a received signal waveform which was distorted by passing through a transmission path to faithfully restore a transmit signal waveform.

In order to consider application to the magnetic recording/reproduction of adaptive equalizing as described above, a digital VTR (Video Tape Recorder) adapted to convert a video and to a digital signal to record the digital signal onto a magnetic tape (video tape) for reproducing it therefrom by using the so-called partial response system is assumed, This partial response system is a system of shaping a spectrum of code by positively utilizing interference between codes due to the transfer characteristic of the transmission path (or recording medium). For example, NRZI code, Interleaved NRZI code, and the like belong to the partial response. On the recording side, there is provided a precoder to convert input data to an intermediate series in order to avoid propagation of code error at the time of reproduction (at the time of discrimination). An example of the configuration on the reproducing side in the case where the above-mentioned adaptive equalizing system is adopted for a digital VTR for carrying out magnetic recording/reproduction by making use of such a partial response system is shown in FIG. 7.

In FIG. 7, a magnetic signal recorded on a recording tape (not shown) is converted to an electric signal by using a magnetic head 101. The electric signal thus obtained is then is amplified by means of a reproducing amplifier 102. The signal thus amplified is sent to a detection characteristic circuit 103. This detection characteristic circuit 103 has a detection characteristic (encode characteristic) of the partial response, and a characteristic of (1+D) in the case of the class IV. An output signal from the detection characteristic circuit 103 is delivered to an equalizer 104 comprised of a FIR (Finite Impulse Response) or a transversal filter, at which adaptive equalizing processing is implemented to that output signal. The output signal thus processed is then delivered to a decoder 105, at which discrimination between "1" and "0" by level comparison (comparate), etc. is carried out. Thus, decoding of data series at the time of recording is conducted.

An output d from the decoder 105 is sent to an adder (error detector) 106, at which an output y from the equalizer 104 is subtracted from the output d. Thus, an (residual) error e is taken out. The error e thus obtained is sent to an adaptive control unit 107. To this adaptive control unit 107, an output x from the detection characteristic circuit 102 is delivered as so called a reference input. The adaptive control unit 107 adjusts the filter characteristic of the equalizer 104 so as to allow a signal power of the (residual) error to be minimum. In the case where so called a transversal filter is used as the equalizer 104, multiplication coefficients (tap coefficients) are adaptively modified (corrected) and updated. Thus, the characteristic of the transversal filter is adjusted so that a characteristic close to an inverse characteristic of the electromagnetic conversion characteristic in the magnetic recording/reproduction is provided.

An output from the encoder 105 is sent to a signal processing circuit 108, at which reproduction of a synchronous block and/or error correction, etc. are carried out. The signal thus processed is sent to a video signal processing circuit 109, at which restoring of original image data is carried out. In addition, although not shown, output data from the signal processing circuit 108 is sent to an audio signal processing circuit and a sub-code signal processing circuit, etc. In these circuits, respective processing are carried out.

Meanwhile, generally, at the time of building up of a servo i.e. when the operation of the capstan servo or the rotary drum servo is initiated, such as at the time of starting of reproduction of VTR, a regenerative signal becomes unstable. As a result, there are instances where updating of the adaptive filter coefficients is not correctly carried out for such an unstable signal, giving rise to a difficulty wherein the series of the tap coefficients diverge.

Further, generally, in VTR, etc., at the time of a variable speed reproduction when reproduction is carried out at a tape speed different from a tape speed at the time of recording, a locus such that the reproducing head traverses a plurality of tracks is depicted. For this reason, for a time period during which scanning is carried out at a position between tracks, or scanning is carried out on a track of which azimuth angle is different from that of the reproducing head, the reproduction level is remarkably lowered. As a result, if a signal at such a portion is used to carry out modifying/updating of the adaptive filter tap coefficients, the operation may frequently becomes unstable.

In addition, in a magnetic reproducing apparatus using rotary head, there is proposed a system in which reproduced data obtained without implementing accurate tracking onto recording tracks on a magnetic tape is written into a memory together with track addresses to read out, from this memory, data in accordance with the order of those track addresses. In this case, even at the time of a reproducing mode of an ordinary speed, a scanning locus of the reproducing head may traverse tracks. At this time, the production level is lowered to such an extent that no effective regenerative signal is provided. For this reason, if the adaptive equalizing is caused to be carried out, there is the possibility that the operation may become unstable.

OBJECTS AND SUMMARY OF THE INVENTION

With the above in view, an object of this invention is to provide a magnetic reproducing apparatus capable of preventing in advance bad influence or effect onto an adaptive equalizing processing resulting from an unstable regenerative signal like at the time of building up of a servo.

Another object of this invention is to provide a magnetic reproducing apparatus capable of preventing a phenomenon such that the operation of the adaptive equalizing becomes unstable resulting from a change of the reproduction level at the time of a variable speed reproducing mode, or a change of the reproduction level in a magnetic reproducing apparatus of the system in which no tracking is applied at the time of reproduction.

To achieve the above-mentioned objects, in accordance this invention, there is provided a magnetic reproducing apparatus adapted for reproducing magnetic data recorded on a magnetic recording medium, comprising a filter serving as an equalizer for compensating the characteristic of a regenerative signal from a magnetic head, a decoder for decoding an output signal from the filter, an adaptive control unit for adaptively adjusting the characteristic of the filter on the basis of an input signal to the filter and input and output signals to and from the decoder, and means for outputting a servo lock signal indicating that a servo control operation at the time of reproduction has become stable, thus to start, in accordance with the servo lock signal, an adaptive adjustment operation of the filter characteristic by the adaptive control unit.

In accordance with the magnetic recording apparatus thus featured, at the time when the servo operation is unstable like at the time of building up of servo in starting of reproduction, the adaptive adjustment operation of the filter characteristic is not carried out. When the servo operation is stabilized, the adjustment operation of the filter characteristic is started for the first time. For this reason, any bad influence or effect on the adjustment operation of the filter characteristic by an unstable regenerative signal can be avoid. Thus, a rapid adaptive operation (equalizing) can be carried out. For example, an inconvenience such that tap coefficients diverge is eliminated. Thus, tap coefficients can rapidly converge into respective optimum tap coefficients.

Further, in accordance with this invention, there is provided a magnetic reproducing apparatus adapted for reproducing magnetic data recorded on a magnetic recording medium, comprising a filter serving as an equalizer for compensating the characteristic of a regenerative signal from a magnetic head, a decoder for decoding an output signal from the filter, an adaptive control unit for adaptively adjusting the characteristic of the filter on the basis of an input signal to the filter and input and output signals to and from the decoder, and means for outputting a variable speed reproducing mode instruction signal indicating whether or not a current or present operation mode is a variable speed reproducing mode where a reproducing speed at the time of reproduction is different from a speed at the time of recording, thus to send this variable speed reproducing mode instruction signal to the adaptive control unit to inhibit adjustment of the filter characteristic at the time of the variable speed reproducing mode.

In addition, in accordance with this invention, there is provided a magnetic reproducing apparatus adapted for reproducing magnetic data recorded on a magnetic recording medium, comprising a filter serving as an equalizer for compensating the characteristic of a regenerative signal from a magnetic head, a decoder for decoding an output signal from the filter, an adaptive control unit for adaptively adjusting the characteristic of the filter on the basis of an input signal to the filter and input and output signals to and from the decoder, and means for outputting an adaptive operation control pulse at the portion where the level of the regenerative signal is above a predetermined value, thus to allow the adaptive control unit to carry out the adjustment operation of the filter characteristic only for a time period during which the adaptive operation control pulse is outputted.

Here, as the adaptive operation permission pulse, a pulse obtained by detecting an envelope of a regenerative signal to discriminate it by a predetermined level may be used. Further, a pulse formed on the basis of a head switching pulse of the rotary head and reproducing speed information at the time of a variable speed reproducing mode and adapted to become "H" (high level) or a predetermined time corresponding to the peak of the reproduction level may be used as the adaptive operation permission pulse.

In accordance with the both magnetic reproducing apparatuses thus featured, the following advantages are provided. Namely, in the case of the former apparatus, since the reproduction level varies at the time of a variable speed reproduction, a technique is employed to inhibit the adaptive adjustment operation of the filter characteristic for that time period to thereby prevent the adaptive adjustment operation of the filter characteristic from becoming unstable. Further, in the case of the latter apparatus, an adaptive operation permission pulse is used to allow the adaptive control unit to carry out the adaptive adjustment operation of the filter characteristic only when the reproduction level is above a predetermined level, so an effective regenerative signal is provided, thereby making it possible to stabilize the adaptive operation.

DESCRIPTION OF THE PREFERRED EMBODIMENTS

Figure 1:
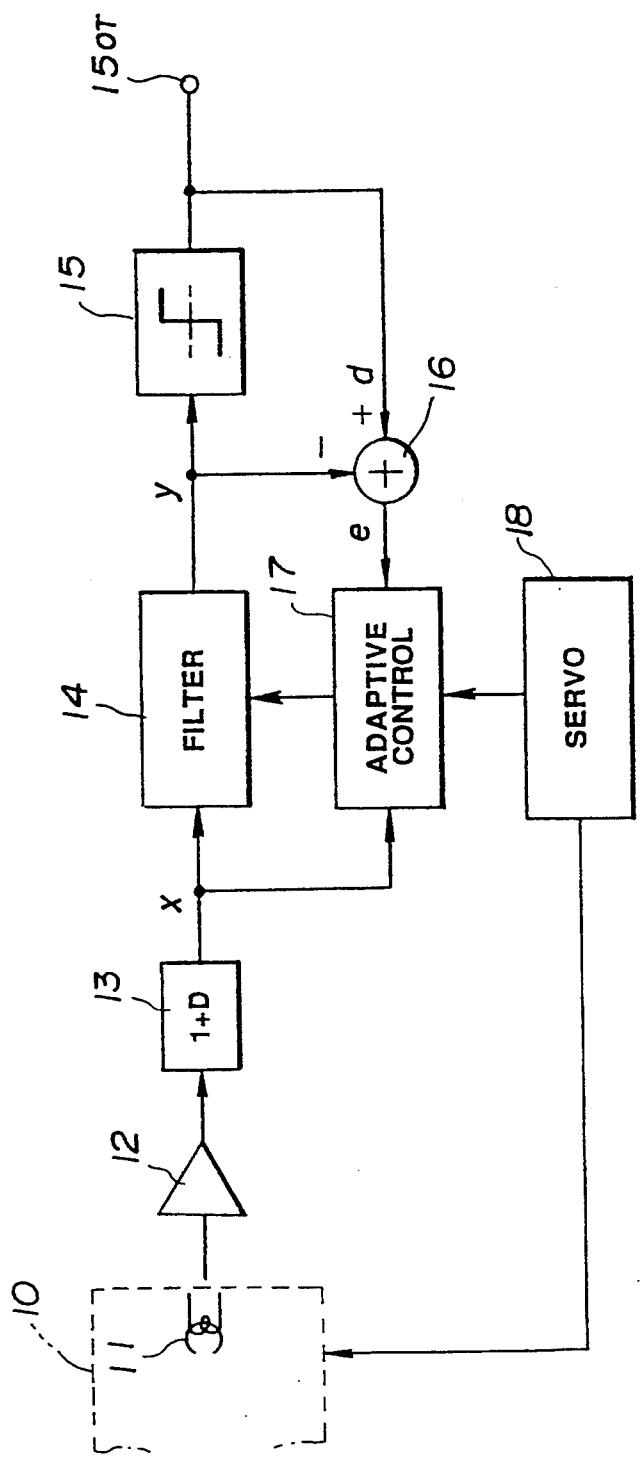
FIG. 1 is a circuit diagram showing, in a block form, the outline of the configuration of a portion of the reproducing system of a digital VTR as a first embodiment of a magnetic reproducing apparatus according to this invention.

FIG. 1 is a circuit diagram showing, in a block form, the outline of the configuration of the reproducing system of a digital VTR as previously described as a first embodiment of a magnetic reproducing apparatus according to this invention.

In FIG. 1, a magnetic signal recorded on a magnetic tape (not shown) is converted to an electric signal by means of a magnetic head 11 within a mechanical block (mechanism unit) of VTR. The electric signal thus obtained is amplified by a reproducing amplifier 12, and is then sent to a detection characteristic circuit 13. This detection characteristic circuit 13 has a detection characteristic (encode characteristic) of the previously described partial response, and has a characteristic of $(1+D)$ in the case of class IV. An output signal from the detection characteristic circuit 13 is delivered to a filter 14 serving as the main part of the equalizer. A FIR (Finite Impulse-Response) filter or a transversal filter is generally used. Its filter characteristic is adaptively adjusted by an adaptive control unit 17 (which will be described later). An output signal from the filter 14 is delivered to a decoder 15, at which discrimination between "1" and "0" by level comparison (comparate), etc. is carried out. Thus, decoding of data series at the time of recording is carried out. An output signal from the decoder 15 is taken out through an output terminal 150T, and is then sent to the previously described signal processing circuit 108, etc. shown in Fig.

An adder (error detector) 16 subtracts an output y of the filter 14 of the equalizer from an output d of the decoder 15 to thereby take out an error (residual) e to send this error e to the adaptive control unit 17. At this time, the adaptive control unit 17 is supplied with an output x from the detection characteristic circuit 13 as so called a reference input. As the result that the adaptive control unit modifies/updates coefficients (tap coefficients) of the filter 14 so as to allow the signal power of the error (residual) to be minimum, the equalizer characteristic is adjusted in such a manner that it becomes close to a characteristic opposite to that of the electromagnetic conversion characteristic in the magnetic recording/reproduction. Namely, the filter 14 and the adaptive control unit 17 constitute an adaptive filter. In other words, the adaptive equalizer can be considered as a circuit element in which an adaptive filter is used as an equalizer.

A servo control unit 18 of FIG. 1 is a circuit section to carry out the servo control operation such as capstan servo or rotary drum servo, etc. of the digital VTR, and is supplied with a FG (Frequency Generator) output pulse signal or a PG (Pulse Generator) output pulse signal, etc. from, e.g., a capstan motor or a rotary drum motor (not shown), etc. within the mechanical block (mechanism unit) 10. This servo control unit 18 monitors rotational speeds or rotational phases of respective motors, e.g., by these FG, PG pulse signals to compare them with respective target or objective values, thus to send, to respective motors, etc. of the mechanical block (mechanism unit) 10, such servo control signals to control those motors so that their rotational speeds or their rotational phase are in correspondence with predetermined target rotational speeds or rotational phases. Further, the servo control unit 18 outputs a servo lock signal such that when the servo control operation is unstable at the time of building up of the servo, etc., that lock signal is in an OFF state, and when servo is effectively applied so that the servo control operation becomes stable, that lock signal is in an ON state, and sends this servo lock signal to the adaptive control unit 17.

The adaptive control unit 17 carries out ON/OFF control of the adaptive processing operation itself such as modification or updating, etc. of coefficients of the filter 14 in accordance with such a servo lock signal, and thus carry out the adaptive processing, i.e., the adaptive adjustment operation of the filter characteristic only when the servo is locked, so a stable servo control operation is being carried out. Thus, when a regenerative input signal is unstable, the adjustment operation of the filter characteristic by the adaptive processing is not carried out. For this reason, it can be prevented in advance that any error occurs in the adaptive process, and bad influence or effect such as divergence of tap coefficients of the filter, or the like can be avoided. In addition, since the adjustment operation of the filter characteristic by the adaptive processing is carried out at the portion where a regenerative input signal is stable, rapid convergence into optimum tap coefficients can be conducted.

An example of an actual configuration of so called an adaptive filter comprised of the filter 14 and the adaptive control unit 17 will now be described with reference to FIG. 2.

Figure 2:
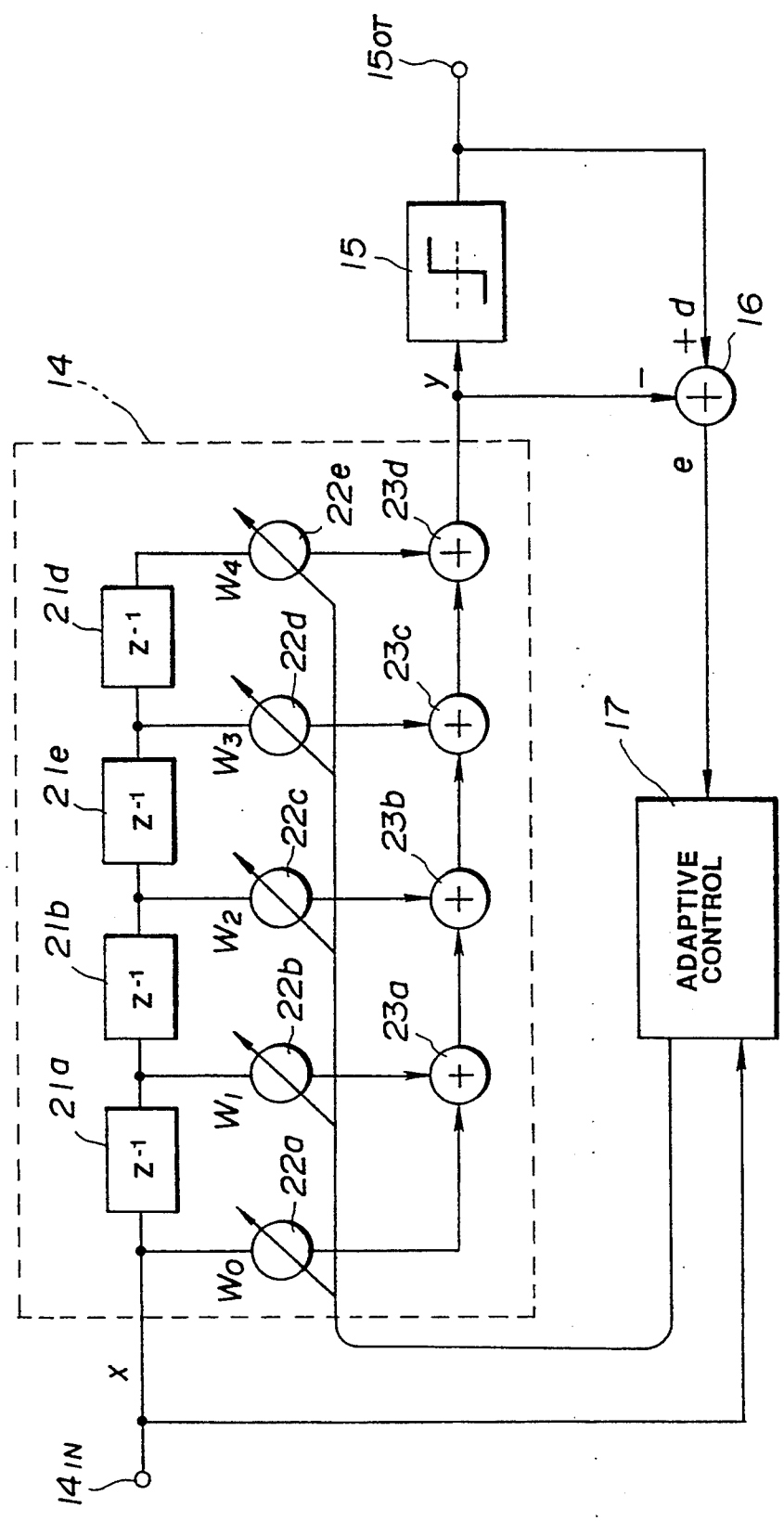
FIG. 2 is a circuit diagram showing, in a block form, an actual example of the internal configuration of an adaptive equalizer (adaptive filter) used in the above-mentioned embodiment.

In FIG. 2, a reference input x from an input terminal $14_{IN}$ is sent to a series circuit comprised of delay elements corresponding to the number of taps, e.g., four delay elements 21a, 21b, 21c and 21d. An input $x_0$ from the input terminal $14_{IN}$ and outputs $x_a$, $x_b$, $x_c$ and $x_d$ from the delay elements 21a, 21b, 21c and 21d are sent to coefficient multipliers 22a, 22b, 22c, 22d and 22e, respectively. At these multipliers, those outputs are multiplied by filter coefficients $W_0$, $W_1$, $W_2$, $W_3$ and $W_4$, respectively. Then, corresponding multiplied results or values are subjected to the following additive operation. Namely, respective outputs from the coefficient multipliers 22a and 22b are added at an adder 23a, and an output from the coefficient multipliers 22c and an output from the adder 23a are added at an adder 23b. Additive operation similar to the above is applied to outputs from the remaining coefficient multipliers. Namely, an output from the coefficient multiplier 22d and an output from the adder 23b are added at an adder 23c. In addition, an output from the coefficient multiplier 22e and an output from the adder 23c are added at an adder 23d. Thus, an output y is provided as an output from the adaptive filter. This output y ms sent to the above-mentioned decoder 15. It is to be noted that respective filter coefficients $W_0$, $W_1$, $W_2$, $W_3$ and $W_4$ are modified by a coefficient modifying (updating) control signal from the adaptive control unit 17.

For the adaptive algorithm used in the adaptive control unit 17, many techniques have been proposed. Explanation will now be given in connection with the LMS (Least Mean Square) algorithm as its actual example. Here, the number of delay elements is generalized so that it becomes equal to L, and delay elements are assumed to be designated at $21, 21_2, \ldots, 21_L$. At this time, it is further assumed that the above-mentioned first input $x_0$ and outputs $x_{-1}, x_{-2}, \ldots, x_{-L}$ from the delay elements $21_1, 21_2, \ldots, 21_L$ are sent to coefficient multipliers $22_0, 22_1, 22_2, \ldots, 22_L$, and are then multiplied by filter coefficients $W_0, W_1, W_2, \ldots, W_L$, respectively. The values thus obtained are sent to adders, at which additive operation similar to the above is implemented thereto.

When input data at the k-th sample period time of (time k) of data series of an input x and delay output data from the delay elements $21_1, 21_2, \ldots, 21_L$ are assumed to be designated at $x_k, x_{k-1}, x_{k-2}, \ldots, x_{k-L}$, an input vector $X_k$ subjected to the FIR filtering is defined as follows:

$$X_k = [x_k x_{k-1} x_{k-2} \ldots x_{k-L}]^T \quad (1)$$

In the above formula (1), T indicates a transposition symbol. When respective filter coefficients (weighting coefficients) are assumed as $W_{k0}, W_{k1}, W_{k2}, \ldots, W_{kL}$ with respect to this input vector $X_k$, and a FIR filter output is assumed as $Y_k$ the relationship of input/output is expressed by the following formula (2)

$$Y_k = w_{k0}x_k + w_{k1}x_{k-1} + \ldots + w_{kL}x_{k-L} \quad (2)$$

Further, if a filter coefficient vector (weighting vector) $W_k$ is defined as follows:

$$W_k = [w_{k0} w_{k1} w_{k2} \ldots w_{kL}]^T \quad (3)$$

the input/output relationship is described as follows:

$$y_k = X_k^T W_k = W_k^T X_k \quad (4)$$

If a desired response is $d_k$, an error $\epsilon_k$ between the desired response and the output $Y_k$ is expressed as follows:

$$\begin{aligned} \epsilon_k &= d_k - y_k \\ &= d_k - X_k^T W_k \end{aligned} \quad (5)$$

Since $W_k$ is updated so that $\epsilon_k$ becomes equal to zero, the following formula is used:

$$W_{k+1} = W_k - \mu \nabla_k \quad (6)$$

In this formula, $\mu$ is a gain factor determining the speed and the stability of the adaptive processing, and $\nabla_k$ indicates gradient. In the LMS algorithm, $\nabla_k$ is not estimated from a short-time mean of $\epsilon_k^2$, but is obtained by directly partially differentiating $\epsilon_k^2$.

$$\begin{aligned} \nabla_k &= \delta \epsilon_k^2 / \delta W \\ &= -2\epsilon_k X_k \end{aligned} \quad (7)$$

By substitution of the formula (7) into the formula (6), the coefficient updating formula is expressed as follows:

$$W_{k+1} = W_k + 2\mu \epsilon_k X_k \quad (8)$$

In the first embodiment of this invention which has been described, the adaptive control operation of the filter characteristic is initiated in accordance with a servo lock signal at the time of reproduction to carry out the adjustment operation of the filter characteristic when the servo is stabilized to thereby avoid bad influence or effect. Explanation will now be given in connection with an embodiment of a magnetic reproducing apparatus adapted to prevent instability of the adaptive equalizing operation at the time of a variable speed reproducing mode such that reproduction is caused to be carried out at a speed different from that at the time of recording.

Figure 3:
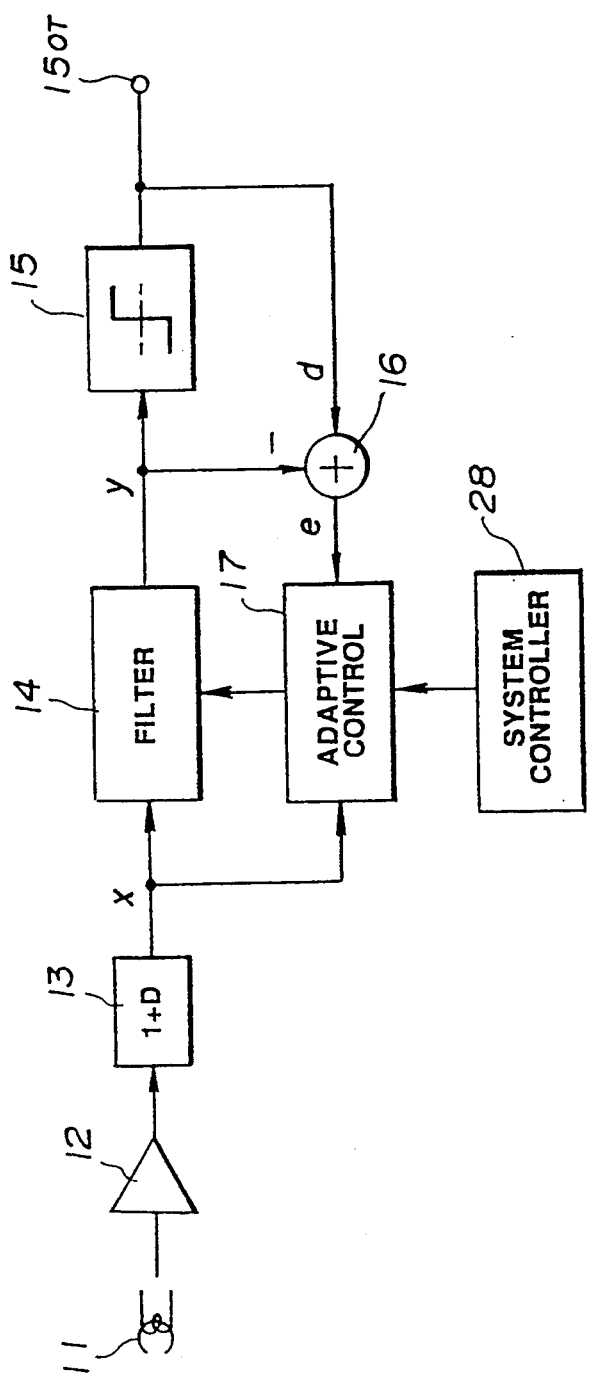
FIG. 3 is a circuit diagram showing, in a block form, the outline of the configuration of a portion of the reproducing system of a digital VTR as a second embodiment of a magnetic reproducing apparatus according to this invention.

FIG. 3 shows the outline of the configuration of a second embodiment of a magnetic reproducing apparatus according to this invention. In FIG. 3, since magnetic head 11, reproducing amplifier 12, detection characteristic circuit 13, filter 14, decoder 15, adder 16 and adaptive control unit 17 are similar to the above-described respective components of FIG. 1, their explanation is omitted.

In FIG. 3, a system controller 28 outputs a variable speed reproducing mode instruction signal such that when the reproducing mode is a variable speed reproducing mode, it represents "H" (high level) and when otherwise, it represents "L" (low level). This variable speed reproducing mode instruction signal is sent to the adaptive control unit 17. At the adaptive control unit 17, when the variable speed reproducing mode instruction signal represents "H", the adaptive adjustment operation of the filter characteristic is inhibited so that no modifying/updating operation of filter tap coefficients is carried out. Accordingly, at the time of a variable speed reproduction when the reproducing level varies, the adaptive adjustment operation of the filter characteristic is inhibited, whereby the adaptive filter characteristic adjustment operation is prevented from becoming unstable.

In such a second embodiment, updating of coefficients of the adaptive filter (filter 14 and adaptive control unit 17) having, as described with reference to FIG. 2, is carried out at all times except for the time of the variable speed reproducing mode, and updating of coefficients is inhibited during the variable speed reproducing mode, thus preventing that the adaptive operation becomes unstable resulting from lowering of the reproduction level. It is here noted that the adaptive operation may be caused to be carried out with respect to the portion even where the reproduction level appears to be high during the variable speed reproducing mode. For this reason, it is conceivable to carry out the updating operation of coefficients at the portion where the reproduction level is high and to inhibit the coefficient updating operation only at the portion where the reproduction level is low. An embodiment based on the above idea will now be described.

Figure 4:
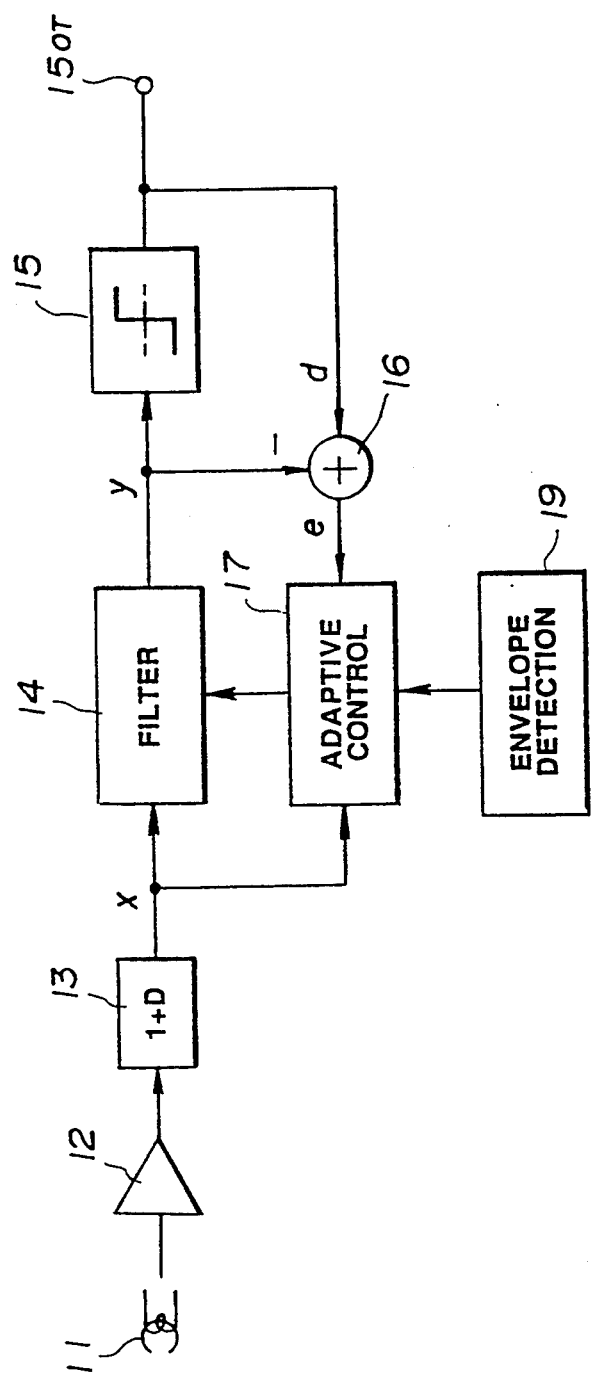
FIG. 4 is a circuit diagram showing, in a block form, the configuration of the essential part of a third embodiment according to this invention.
Figure 5:
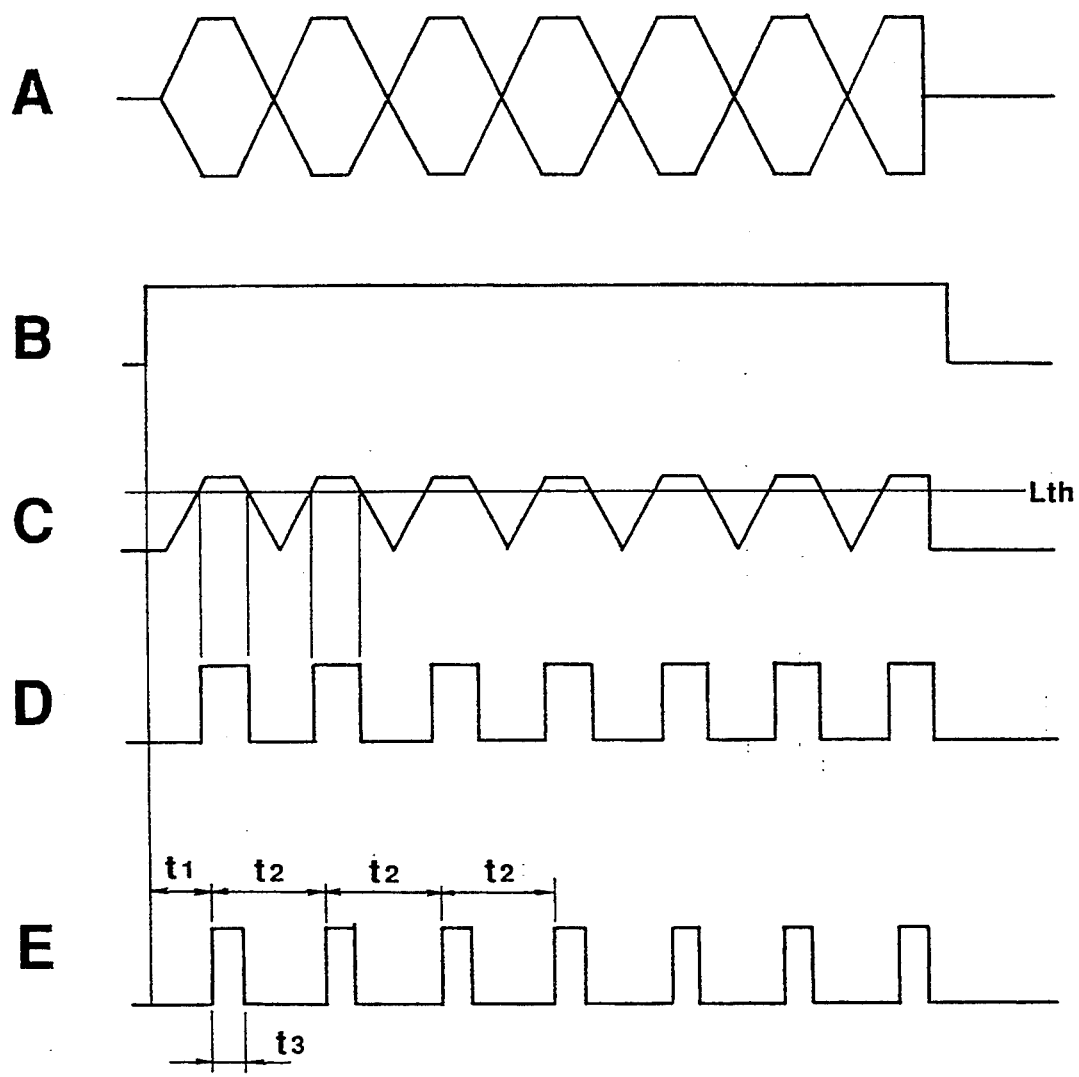
FIG. 5 is a timing chart for explaining the operation of the above-mentioned embodiment.

Namely, FIG. 4 shows the example in the case of detecting an envelope of a regenerative signal to carry out the coefficient updating operation only at the portion where that signal level is above a predetermined level. In FIG. 4, an envelope detector 19 envelope-detects a regenerative signal (a regenerative RF signal, see A of FIG. 5) from the reproducing amplifier 12 to obtain an envelope detected output signal as shown at C of FIG. 5 to level-discriminate it by a predetermined threshold level Lth to thereby output an adaptive operation permission (enable) pulse signal as shown at D of FIG. 5. The adaptive operation permission pulse signal shown at D of FIG. 5 is sent to the adaptive control unit 17 to permit execution of the above-described filter characteristic adjustment operation, i.e., the updating operation of filter tap coefficients at the portion where that pulse signal represents "H" (high level), i.e., the reproduction level is above a threshold level Lth. It is to be noted that since other components of FIG. 4 are similar to those of respective components of FIG. 1 previously described, the same reference numerals are respectively attached to corresponding portions, and their explanation is omitted here.

In this case, symbol A of FIG. 5 represents an amplitude of a regenerative RF signal at the time of a variable speed reproducing mode. Since a scanning locus of the reproducing head traverses a plurality of tracks at the time of a variable speed reproducing mode, changes in the amplitude as shown at A of FIG. 5 take place. Moreover, symbol B of FIG. 5 represents so called a RF switching pulse for switching of the reproducing head. In the envelope detector 19 of FIG. 4, the regenerative RF signal shown at A of FIG. 5 is envelope-detected to obtain a waveform as shown at C of FIG. 5 to level-discriminate it by a predetermined threshold level Lth, thus to obtain a pulse signal as shown at D of FIG. 5. When the above-mentioned reproduction level is above a threshold level Lth, the pulse signal shown at D of FIG. 5 is at "H" (high level). At the portion of "H", an effective regenerative signal is provided. Accordingly, at the time of a variable speed reproducing mode, even if the adaptive filter coefficient updating operation is carried out at the portion of "H" of the pulse signal shown at D of FIG. 5 by means of the adaptive control unit 17, there is no possibility that the operation of the adaptive equalizing circuit may become unstable.

Meanwhile, the above-mentioned third embodiment may be applied to a magnetic reproducing apparatus of the system in which reproduction data is obtained without carrying out a precise tracking with respect to recording tracks on a magnetic tape and is written into a memory together with track addresses to read out data in accordance with the order of those track addresses from the memory. In such a magnetic reproducing apparatus of this system, a change in the reproduction level occurs even at the time of an ordinary speed reproducing mode, resulting in the possibility that the above-mentioned adaptive equalizing operation may become unstable by a regenerative signal at the portion where the reproduction level is low. However, by carrying out the above-mentioned adaptive filter coefficient updating operation only at the portion where the reproduction level is above a predetermined threshold level Lth as in the above-described third embodiment, a stable adaptive equalizing operation can be realized in a magnetic reproducing apparatus as mentioned above.

Figure 6:
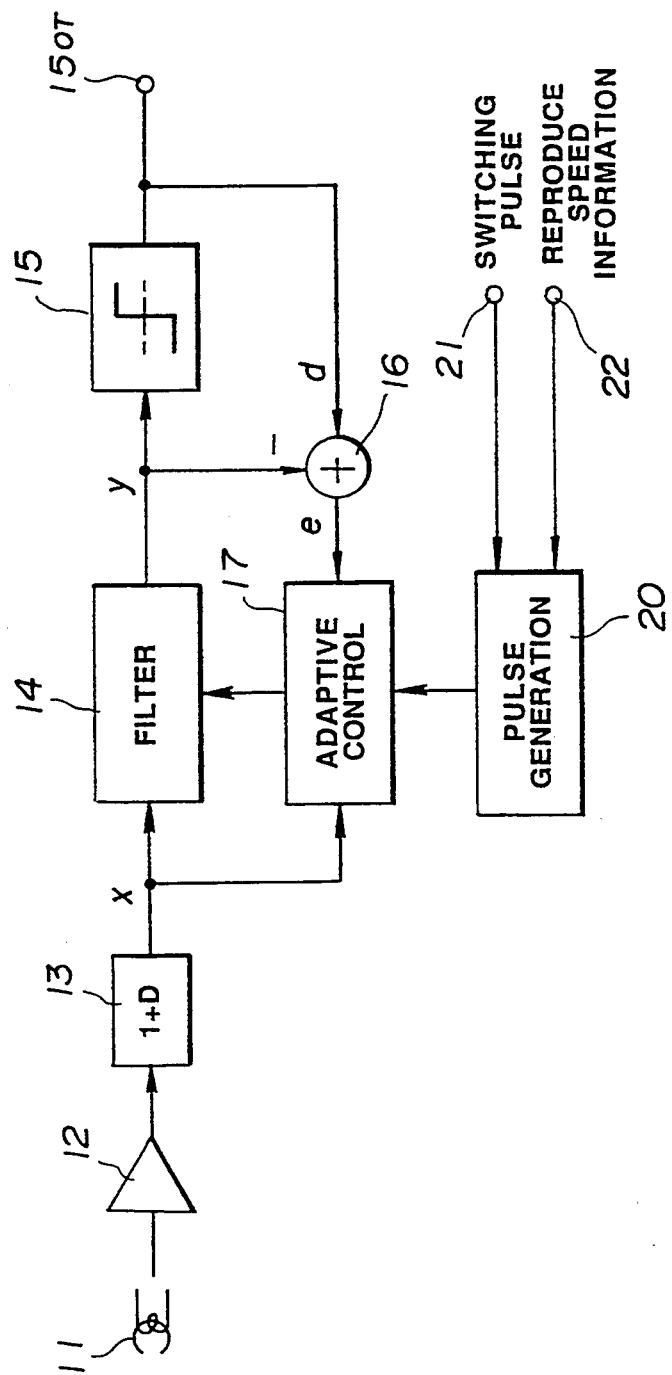
FIG. 6 is a circuit diagram showing, in a block form, the configuration of the essential part of a fourth embodiment according to this invention.
Figure 7:
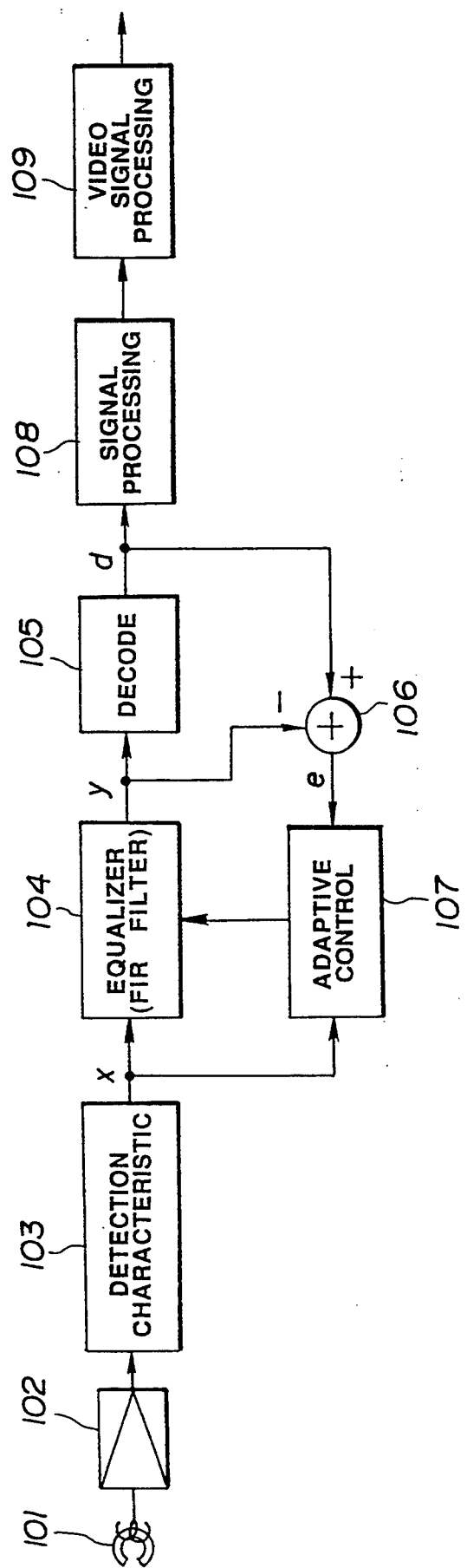
FIG. 7 is a circuit diagram showing, in a block form, the outline of the configuration of a digital VTR used for explanation of the prior art.

FIG. 6 shows the configuration of the essential part of a magnetic reproducing apparatus as a fourth embodiment of this invention. In the fourth embodiment, by taking into consideration the fact that when a timing and a reproducing speed (what times of a basic or reference reproducing speed a current or present speed is?) of a RF switching pulse for switching of head at the time of a variable speed reproduction mode are known, a timing and a time period at the portion where the level of a regenerative signal is high will be determined, an adaptive operation permission pulse signal is formed on the basis of the head switching pulse and the reproducing speed information to carry out ON/OFF control of the updating operation of filter coefficients of the adaptive equalizing in accordance with this pulse signal.

Namely, in FIG. 6, a pulse generator 20 forms an adaptive operation permission pulse signal shown at E of FIG. 5 on the basis of a RF switching pulse for switching of the head as shown at B of FIG. 5 delivered from an input terminal 21 and reproducing speed information (information indicating what times of a basic or reference reproduction speed a current or present speed is) delivered from an input terminal 22. The adaptive operation permission pulse signal shown at E of FIG. 5 is formed as follows. When a (e.g. rise) timing of the switching pulse and the reproduction speed information are known, a level change pattern of a regenerative signal as shown at A or C of FIG. 5 is uniquely determined in accordance with the above-mentioned timing and the reproducing speed information, an adaptive operation permission pulse signal is formed so that it is at "H" (high level) at the portion where the reproduction level in the level change pattern is high, so an effective regenerative signal is provided. The pulse generator 20 generates a pulse rising at a timing when a time $t_1$ has passed from the rise of the RE switching pulse for switching of the head shown at B of FIG. 5, and having a width $t_3$ repeating at a period of a time $t_2$ wherein these respective times $t_1$, $t_2$ and $t_3$ are uniquely determined by the reproducing speed information. While these respective times $t_1$, $t_2$ and $t_3$ may be obtained by making a calculation on the basis of reproducing speed information as described above, a ROM table having the reproducing speed information as an input and the respective times $t_1$, $t_2$ and $t_3$ as outputs may be used to readily realize values of such times $t_1$, $t_2$ and $t_3$. Further, in the case where the scanning starting position of the reproducing head relative to recording tracks shifts or changes with the lapse of times like at the time of a variable speed reproducing mode except for a speed of multiples of integer, or the like, the change pattern of the reproduction level also varies with lapse of times. For this reason, a technique may be employed to send scanning starting position information of the reproducing head with respect to recording tracks of a tape, or the like to the pulse generator 20 to obtain an adaptive operation permission pulse signal of a pulse pattern corresponding to an actual level change pattern.

Since such an adaptive operation permission pulse signal from the pulse generator 20 is sent to the adaptive control unit 17 to cause the updating operation of filter tap coefficients to be permitted (enabled) only at the "H" portion, the adaptive equalizing operation is carried out only at the portion where the reproduction level is high, so an effective regenerative signal is obtained. For this reason, the adaptive equalizing operation is stabilized. It is to be noted that since other components of FIG. 6 are similar to those of FIG. 1 previously described, the same reference numerals are respectively attached to corresponding parts, and their explanation is omitted here.

It should be noted that this invention is not limited to the above-described embodiments. For example, the actual configuration of the filter 14 and/or the algorithm used in the adaptive control unit 17, etc. are not limited to the FIR filter and the LMS algorithm, respectively. In addition, equipments applied are not limited to a digital VTR, and this invention may be applied to a digital tape recorder, an analog VTR, or the like.

What is claimed is:

1. A reproducing apparatus for reproducing data recorded on a recording medium, comprising:
   at least one servo motor,
   a filter serving as an equalizer for compensating the characteristic of a regenerative signal from a read head,
   a decoder for decoding an output signal from said filter,
   an adaptive control unit for adaptively adjusting the characteristic of said filter as a function of an input signal supplied to said filter and as a function of input signals supplied to and output signals received from said decoder, and
   means for monitoring one of a rotational speed and a rotational phase of said at least one servo motor and for outputting, when said one of said rotational speed and said rotational phase corresponds to a predetermined target value, a servo lock signal indicating that a servo control operation of said at least one servo motor has become stable, thereby permitting said adaptive control unit to adaptively adjust the filter characteristic.

2. A reproducing apparatus as set forth in claim 1, wherein a regenerative signal from said read head is sent to said filter through a detection characteristic circuit having a partial response detection characteristic.

3. A reproducing apparatus as set forth in claim 1, wherein said filter is a FIR (Finite Impulse Response) filter.

4. A reproducing apparatus as set forth in claim 1, wherein said decoder level-discriminates an output signal from said filter and thereby outputs a binary signal of "1" or "0".

5. A reproducing apparatus as set forth in claim 1, wherein said filter exhibits filter coefficients and said adaptive control unit modifies said filter coefficients of said filter so as to minimize an error between input and output signals of said decoder.

6. A reproducing apparatus as set forth in claim 1, wherein said adaptive control unit uses a LMS (Least Mean Square) algorithm as an adaptive algorithm.

7. A reproducing apparatus as set forth in claim 1, wherein said means for monitoring operates to monitor a pulse signal representing said one of said rotational speed and said rotational phase and operates to output said servo lock signal to indicate that said servo control operation of said at least one servo motor has become stable when said pulse signal corresponds to said predetermined target value.

8. A reproducing apparatus operable at a changeable reproducing speed for reproducing data recorded on a recording medium, comprising:
   a filter serving as an equalizer for compensating the characteristic of a regenerative signal from a read head,
   a decoder for decoding an output signal from said filter,
   an adaptive control unit for adaptively adjusting the characteristic of said filter as a function of an input signal supplied to said filter and as a function of input signals supplied to and output signals received from said decoder, and
   means for determining a level change pattern in said regenerative signal as a function of a switching pulse and reproducing speed information and for outputting an adaptive operation permission pulse when the level change pattern is at a high level such that said adaptive control unit adaptively adjusts the filter only when the adaptive operation permission pulse is outputted.

9. A reproducing apparatus as set forth in claim 8, wherein a regenerative signal from said read head is sent to said filter through a detection characteristic circuit having a detection characteristic of a partial response.

10. A reproducing apparatus as set forth in claim 8, wherein said filter is a FIR (Finite Impulse Response) filter.

11. A reproducing apparatus as set forth in claim 8, wherein said decoder level-discriminates an output signal from said filter and thereby output a binary signal of "1" or "0".

12. A reproducing apparatus as set forth in claim 8, wherein said adaptive control unit modifies tap coefficients of said filter so as to minimize an error between input and output signals of said decoder.

13. A reproducing apparatus as set forth in claim 8, wherein said adaptive control unit uses a LMS (Least Mean Square) algorithm as an adaptive algorithm.

* * * * *